United States Patent

[11] 3,615,506

[72] Inventors John R. Abbott;
 William F. Coffey, both of Rochester, N.Y.
[21] Appl. No. 9,665
[22] Filed Feb. 9, 1970
[45] Patented Oct. 26, 1971
[73] Assignee Eastman Kodak Company
 Rochester, N.Y.
 Continuation-in-part of application Ser. No. 812,853, Apr. 2, 1969, now abandoned.

[54] SILVER HALIDE EMULSIONS CONTAINING 3-CYCLICAMINO-5-PYRAZOLONE COLOR COUPLERS
7 Claims, 2 Drawing Figs.

[52] U.S. Cl. .................................................. 96/56.5,
 96/100, 260/310
[51] Int. Cl. ...................................................... G03c 7/00,
 G03c 1/40

[50] Field of Search ............................................. 96/55, 100,
 56.5

[56] References Cited
UNITED STATES PATENTS
2,619,419 11/1952 Jennen ......................... 96/100
2,632,702 3/1953 Sawdey ........................ 96/100
3,183,095 5/1965 Klinger ........................ 96/100

Primary Examiner—J. Travis Brown
Attorneys—Ogden H. Webster, J. R. Frederick and W. H. J. Kline ABSTRACT: Novel 3-(cyclicamino)-5-pyrazolones and other 3-(substituted amino)-5-pyrazolone couplers valuable for use in color photography are advantageously prepared in good yields from the corresponding 3-alkoxy-5-pyrazolones by a novel single step synthesis in which a mixture of (1) the appropriate 3-alkoxy-5-pyrazolone, or a primary amine and (3) an acid catalyst having a pKa smaller than about 10.2 is heated.

FIG. 1

FIG. 2

SILVER HALIDE EMULSIONS CONTAINING 3-CYCLICAMINO-5-PYRAZOLONE COLOR COUPLERS

This application is a continuation-in-part of our copending U.S. Pat. application Ser. No. 812,853 filed Apr. 2, 1969, now abandoned.

This invention relates to color photography, one-substituted, 3-substituted-amino-5-pyrazolones, the synthesis of these compounds and their use in color photography.

The formation of color photographic images by coupling the developing product, that is, oxidized primary aromatic amino color developing agents with color-forming or coupling compounds, is well known. In these processes, the subtractive process of color formation is ordinarily used in which phenolic or naphtholic couplers are used to produce the cyan dye, 5-pyrazolone couplers are used to produce the magenta dye and compounds having an active methylene group separating two carbonyl groups are used to form the yellow dye.

It is known to prepare certain 3-substituted 5-pyrazolone couplers by reacting a 3-amino-5-pyrazolone with an alkyl-substituted amine or aniline with the formation of the corresponding 3-alkylamino-5-pyrazolone or 3-anilino-5-pyrazolone and the evolution of ammonia as described in Porter et al., U.S. Pat. No. 2,343,703. This method for the preparation of 3-anilino-5-pyrazolones is very limited since arylamines less basic than aniline or arylamines having a substituent in the ortho position are either inoperative or give very poor yields in this reaction. Another method, the Smiles rearrangement, has been used to prepare 3-(o-p-nitroanilino)-5-pyrazolones by the deacylation of the corresponding nitrophenoxy acetamido derivative as shown by U.S. Pat. No. 2,983,608. This reaction is applicable only to the synthesis of 3-(o- or p-nitroanilino) derivatives and rearrangement does not occur with the m-nitrophenoxy analogue or with other p-substituted phenoxy acetamido-5-pyrazolones. Other methods available for preparation of 3-substituted amino-5-pyrazolones require a complete synthesis starting with linear compounds oftentimes going through numerous steps including the ring closing step to produce the 3-substituted amino-5-pyrazolone coupler. Improved syntheses with high yields are desired for producing a wide range of 3-substituted amino-5-pyrazolone couplers for existing 5-pyrazolone couplers.

It is therefore an object of our invention to provide a novel method for synthesizing in high yields desirable 3-substituted amino-5-pyrazolone couplers from existing 3-alkoxy-5-pyrazolone couplers.

Another object of our invention is to provide a synthesis for producing valuable 3-substituted amino-5-pyrazolones from existing 5-pyrazolone couplers using a novel single step synthesis that gives high yields of a desired coupler.

Another object of our invention is to provide novel 3-cyclicamino-5-pyrazolone couplers which are valuable for use in color photography.

It is likewise an object of this invention to provide novel 5-pyrazolone couplers which react with oxidized aromatic primary amino color developing agents to form a dye and a silver halide development inhibitor.

Still other objects will become apparent from a consideration of the following specification and claims.

These and other objects of our invention are accomplished with certain novel 3-substituted amino-5pyrazolone couplers described herein and with a novel synthesis which comprises the single step of heating a mixture of (1) an intermediate coupler having from one to two 5-pyrazolone moieties, at least one of said moieties having an alkoxy group attached to a carbon atom in the 3 position and (2) an amine that is either a primary amine or a secondary amine in which the amine nitrogen atom is in a saturated ring having no more than six atoms in the ring, in the presence of an acid catalyst. Alternatively, the acid salt of the amine is used in place of the amine per se in which case the acid used in making the amine salt is the catalyst in this reaction.

The substituents on the 1 and 4 positions of the immediate 5-pyrazolone coupler used in our synthesis can be any of those shown in the prior art 5-pyrazolone couplers. These groups do not enter into the reaction so there is no limitation as to what they can be nor is it required that the substituents in the 1 and 4 positions be attached to the ring before carrying out the reaction of this invention, except that when $R_3$ of formula I below represents an organic monothio group higher yields will generally be obtained if the monothio group is introduced on to the pyrazolone ring after carrying out the reaction of our invention. The substituent attached to the 1 position of the 5-pyrazolone intermediate coupler does, however, have an influence on the selection of the acid catalyst used. Strong acids are used advantageously for our synthesis regardless of the substituent on the 1 position of the 5-pyrazolone ring. However, when the 1 substituent is an alkyl group, an unsubstituted phenyl group, or a phenyl group substituted with one or several mildly electron withdrawing radicals, relatively weak acid catalysts are also used advantageously in our synthesis. The syntheses of our invention provide an efficient one step reaction for making a wide variety of 3-substituted amino-5-pyrazolone couplers that are valuable for use in color photography.

Included among the couplers advantageously prepared by our synthesis are those having the formulas:

wherein R and $R_4$ each represent a member selected from the class consisting of hydrogen, an alkyl group having from 1 to 22 carbon atoms (such as methyl, ethyl, propyl, butyl, tert-butyl, 4-chloro-butyl, 4-nitroamyl, hexyl, octyl, decyl, octadecyl, docosyl, benzyl, phenethyl, etc.), an aryl group, such as, a phenyl group, e.g., phenyl, halophenyl, such as, 2-chlorophenyl, 2-bromophenyl, 2,6-dichlorophenyl, 2,4,6-trichlorophenyl, 3,5-dibromophenyl, 4-chlorophenyl, etc., a cyanophenyl, such as, 4-cyanophenyl, 2-cyanophenyl etc., a nitrophenyl, such as 4-nitrophenyl, 3-nitrophenyl, etc., an alkylphenyl, such as, 4-methylphenyl, 2,6-dimethylphenyl, 4-butylphenyl, etc., a fluoroalkylphenyl, such as, trifluoromethylphenyl, 2-trifluoromethylphenyl, etc., an alkoxyphenyl, such as, 2-ethoxyphenyl, 2-butoxyphenyl, etc., an arylphenyl, e.g. 4-phenylphenyl, etc., an aryloxyphenyl, such as phenoxyphenyl, etc., N-substituted benzamidophenyl, such as N-methylbenzamidophenyl, N-butylbenzamidophenyl, etc., a N,N-disubstituted carbamylphenyl, such as, N,N-diphenylcarbamylphenyl, N,N-dibutylcarbamylphenyl, N,N-dioctadecylcarbamylphenyl, etc., a N,N-disubstituted sulfamylphenyl, e.g., N,N-diphenylsulfamylphenyl, N,N-dibutylsulfamylphenyl, etc. a phenyl-N-substituted sulfonamidophenyl, e.g., phenyl-N-methylsulfonamidophenyl, phenyl-N-phenyl-sulfonamidophenyl, etc., and various combinations of these, such as, 2-methyl-5-nitrophenyl, 2-chloro-5-cyanophenyl, 5-chloro- 2-methylphenyl, 2,6-dichloro-4-methoxyphenyl, 2,4-dichloro-6-methylphenyl, 2,6-dichloro-4-nitrophenyl, 2-chloro-4,6-dimethylphenyl, etc., and a heterocyclic group particularly a heterocyclic group having from 5 to 6 atoms in the ring, such as, a 2-thiazolyl group, a 2-benzothiazolyl, a 2-benzoxazolyl, a 2-oxazolyl, a 2-imidazolyl, a 2-benzimidazolyl, etc.); $R_1$ represents hydrogen or preferably the nonmetallic atoms which taken together with $NR_2$ complete a 4 to 6 membered saturated ring, e.g., an azetidino group, a pyrrolidino group, a morpholino group, a piperidino group and an indolino group, etc., any of which are either unsubstituted or substituted with any groups that can be substituted on alkyl groups but preferably substituents that aren't stronger nucleophiles than the amino group (such as alkyl, especially lower alkyl, halogen, hydroxyl, carboxy, lower alkoxycarbonyl groups, a sulfo, an amido, a sulfamyl, a carbamyl, etc.); $R_2$ represents an alkyl group having from 1 to 22 carbon atoms, e.g., methyl, ethyl, butyl, secondary butyl, t-butyl, cyclopropyl, cyclohexyl, benzyl, phenethyl, octadecyl, docosyl, etc., which are either unsubstituted or substituted with any groups that can be substituted on alkyl groups but preferably substituents that aren't stronger nucleophiles than the amino group (such as hydrogen, hydroxyl, a substituted amino, carboxy, an alkoxycarbonyl, a sulfo, an amido, a sulfamyl, a carbonyl, etc.), an aryl group, such as a phenyl group (e.g., a nitrophenyl group, an alkylphenyl group, a chlorophenyl group, a fluorophenyl group, an alkoxyphenyl group, an acetamidophenyl group, a sulfonylphenyl group, a sulfamylphenyl group, a carbamylphenyl group, a carbonylphenyl group, etc.), a naphthyl group (e.g., naphthyl, or naphthyl substituted with any of the substituents indicated for phenyl in the definition of $R_2$), an anthracinyl group (e.g., anthracinyl or anthracinyl substituted with any of the substituents defined for the phenyl group in the definition of $R_2$), a diphenyl, a terphenyl, a quatraphenyl (e.g., diphenyl, terphenyl and quatraphenyl and any of these groups which are further substituted with the substituents defined for phenyl in the definition of $R_2$), a heterocyclic group, e.g., a selenazolyl, an oxazolyl, a benzoxazolyl, a thiazolyl, a benzothiazolyl, a naphthoxazolyl, a naphthiazolyl, an imidazolyl, a benzimidazolyl, etc., and preferably the nonmetallic atoms which taken together with $NR_1$ complete a 4 to 6 membered saturated ring as described previously for $R_1$; $R_3$ represents hydrogen or any of the groups found as substituents on the 4 position of any of the prior art dye-forming 5-pyrazolone couplers (colored or uncolored) and on competing 5-pyrazolone couplers including a thiocyano group, an acyloxy group (such as an alkoyloxy group having from 1 to 22 carbon atoms, e.g., acetoxy, 3-pentadecylphenoxyacetoxy, propionyloxy, hexanoyloxy, docanoyloxy, octadecanoyloxy, 3-phenylpropionyloxy, etc., an aryloyloxy group, e.g., a benzoyloxy group, 3-(2-carboxybenzamido)benzoyloxy, 3-(β-sulfopropionamido)-benzoyloxy, α-naphthoyloxy, β-naphthoyloxy, 2,4,6-trichlorobenzoyloxy, 4-ethoxybenzoyloxy, 4-fluorobenzoyloxy, 3-[γ-(2,4-di-t-amy(phenoxy)butyramido]benzoyloxy, etc., a heterocycloyloxy group, e.g., a benzofuranyloyloxy group, a furanyloyloxy group, a thiazoloyloxy group, an oxazoloyloxy group, etc.), an aryloxy group, e.g., a phenoxy group, a naphthoxy group, etc., an alkoxy group, e.g., methoxy, butoxy, octadecyloxy, etc., chlorine, fluorine, a sulfo group, e.g., sulfo or alkali metal salt of the sulfo group, an arylazo group, e.g., a phenylazo (such as phenylazo, a tolylazo group, a chlorophenylazo group, a benzamidophenylazo group, an acetamidophenylazo group, a methoxyphenylazo group, a naphthylazo group, etc.), a 2-aminoarylazoxy group (e.g., 2-amino-4-methylphenylazoxy, 2-aminophenylazoxy, 2-amino-4-chlorophenylazoxy, etc.); a 2-amidoarylazoxy group (e.g., 2-acetamidophenylazoxy, 2-acetamido-4-methylphenylazoxy, 2-acetamido-4-chlorophenylazoxy, 2-palmitamidophenylazoxy, 4-methoxy-2-palmitamidophenylazoxy, 4-chloro-2-palmitamidophenylazoxy, etc.); a 2-aryltriazolyl group (e.g., 2-benzotriazolyl, 5-chloro-2-benzotriazolyl, 5-hydroxy-2-benzotriazolyl, 4,7-dinitro-2-benzotriazolyl, 5-methyl-2-benzotriazolyl,6-methoxy-2-benzotriazolyl, 4-carboxyethyl-2-benzotriazolyl, 4-sulfoethyl-2-benzotriazolyl, 2-naphthotriazolyl, 4-methyl-2-naphthotriazolyl, 5-chloro-2-naphthotriazolyl, 5-hydroxy-2-naphthotriazolyl, 5-nitro-2-naphthotriazolyl, 5-sulfoethy1-2-naphthotriazolyl, 4-amino-2-naphthotriazolyl, benzo[1,2-d:4,5-d']-bistriazolyl, etc.), an alkyl group having from 1 to 22 carbon atoms, e.g., methyl, ethyl, propyl, octyl, decyl, octadecyl, and preferably an organic monothio group, such as an alkylthio group (usually having from 6 to 10 carbon atoms), an arylthio group (generally a phenyl or naphthyl), a cycloalkylthio group (generally having 5 to 6 carbon atoms in the ring), especially preferred is a carbon-containing heterocyclic monothio group (generally having a 5 to 6 membered ring containing at least one hetero nitrogen, oxygen or sulfur atom and preferably 1 to 4 hetero nitrogen atoms) including heterocyclic radicals such as tetrazolyls, triazinyls, triazolyls, oxazolyls, oxadiazolyls, diazolyls, thiazyls, thiadiazolyls, benzoxazolyls, benzothiazolyls, pyrimidyls, pyridinyls, quinolinyls, benzimidazolyls, etc., in which the aryl-, cycloalkyl- and heterocyclic- moieties of the monothio group are incapable of forming a chromophoric compound and are either unsubstituted or substituted with groups, such as nitro, halogen (chlorine, bromine, iodine, fluorine), lower alkyl, lower alkylamido, lower alkoxy, lower alkylsulfonamido, α-chloroacetylthio, lower alkylcarbamyl, amino, etc., typical monothio groups representing the above include alkylthio groups e.g., hexylthio, octylthio, decylthio, etc.), an arylthio group (e.g., 2-nitrophenylthio), a cycloalkylthio group (e.g., cyclopentylthio, cyclohexylthio, etc.), a heterocyclicthio group (e.g., 2-benzothiazolylthio, 1-phenyl-5-tetrazolylthio, 1-(4-carbomethoxyphenyl)-5-tetrazolylthio, 5-phenyl-1,3,4-oxadiazolyl-2-thio, 2-phenyl-5-(1,3,4 )-oxadiazolylthio, 2-benzoxazolylthio, 2-benzimidazolylthio, etc.); and L represents as a divalent linkage member, namely, a lower alkylene group, e.g., methylene, ethylene, propylene, butylene, benzylidene, etc., a lower alkylidyne group, e.g., methylidyne ethylidyne, etc., a benzo[1,2-d:4,5-d']-bistriazolyl group, etc., or a bond linking the 5-pyrazolone moieties.

A preferred embodiment of the present process comprises the single steps of heating, generally in the range from about 50° C. to about 250° C., a mixture of:

1. a compound having one of the formulas:

wherein R, $R_3$, $R_4$ and L are as defined previously and $R_5$ represents an alkyl group, preferably a lower alkyl group having from 1 to 4 carbon atoms and

2. an amine having the formula:

V wherein $R_1$ and $R_2$ are as defined previously in the presence of an acid catalyst. The acid catalyst is either added to the reaction mixture as a separate component or alternatively it is advantageously added with the amine as the said salt of the amine represented by the formula:

VI

HX represents any organic or inorganic compound that can produce one or more ionizable protons per molecule and which has a pKa of less than 10.2. The pKa of an acid is the negative logarithm of the ionization constant for the acid. The pKa value is inversely proportional to the strength of the acid and is not available for some of the strong and very strong inorganic acids. Organic compounds used advantageously as acid catalysts according to our invention included the following typical examples:

| Organic Acids | pKa |
| --- | --- |
| acetic acid | 4.8 |
| benzoic acid | 4.2 |
| formic acid | 3.8 |
| chloroacetic acid | 2.9 |
| fluoroacetic acid | 2.6 |
| dichloroacetic acid | 1.5 |
| trichloroacetic acid | 0.6 |
| malonic acid | 2.9 |
| propionic acid | 4.8 |
| n-valeric acid | 4.8 |
| n-octanoic acid | 4.8 |
| benzenethiol | 7.8 |
| isobutyric acid | 4.8 |
| trimethylacetic acid | 5.0 |
| phenylacetic acid | 4.31 |
| acetoacetic acid | 3.58 |
| cyclopropane carboxylic acid | 4.8 |
| cyclohexane carboxylic acid | 4.9 |
| methane sulfonic acid | −0.6 |
| p-toluene sulfonic acid | −1.3 |
| oxalic acid | 1.2 |
| glycolic acid | 3.7 |
| phenol | 10.0 |
| benzene boronic acid | 8.9 |

Inorganic compounds used advantageously according to our invention include the following typical examples:

| Inorganic Acids | pKa |
| --- | --- |
| perchloric acid | <−14.0 |
| sulfuric acid | <−14.0 |
| pyrosulfuric acid | <−14.0 |
| phosphoric acid | 2.1 |
| hydrochloric acid | <−14.0 |
| nitric acid | <−14.0 |
| sulfurous acid | 4.0 |
| phosphinic acid | 4.0 |
| diphosphoric acid | 0.8 |
| hydrogen tetrafluoroborate | <−14.0 |
| hydrogen fluoride | <−14.0 |

The inorganic acid catalysts are all such strong acids that in most cases exact pKa values are not available. The inorganic acid catalysts of our invention are advantageously used in any of our reactions while the organic acids mentioned are used advantageously when R and $R_4$ is an alkyl group, an unsubstituted phenyl group, or a phenyl group substituted with one of several mildly electron withdrawing radicals.

Although the ratios of the amounts of reactants can advantageously be varied over a relatively wide range, it is usually most advantageous to use them in substantially equimolar amounts and to use an amount of acid that is substantially equimolar with the amount of the amine used.

The reaction time of the present 5-pyrazolone synthesis can be widely varied, the reaction being allowed to continue until substantially complete. Reaction time varies with such variables as the temperature, the catalyst and the reactants. Certain reactions of the invention proceed substantially simultaneously, while other reactions may take 1 to 3 hours to complete.

The 3-cyclic amino-5-pyrazolones of formulas I and II in which represents a 4 to 6 membered saturated ring, e.g., an azetidino group, a pyrrolidino group, a morpholino group, a piperidino group, and an indolino group are novel couplers that are valuable for use in color photography.

Especially valuable for use in color photography are 3-cyclic amino-5-pyrazolone couplers of formula I in which $R_3$ represents an organic monothio group, preferably a carbon-containing heterocyclic monothio group, especially a tetrazolylthio, a benzothiazolylthio or an oxadiazolylthio group.

5-Pyrazolone couplers are used in the subtractive color system to produce magenta dyes. 3-Primary amino-4-organic monothio substituted-5-pyrazolones are known magenta dye-forming couplers. These couplers, when reacted with oxidized color photographic developing agents, couple-off by a process known as elimination coupling the organic monothio group in the 4-position (the coupling position) of 5-pyrazolones. This organic monothio group thereupon forms a mercaptan which acts to further inhibit development of silver halide at the development site where this mercaptan-forming moiety was released. The 5-pyrazolone couplers which produce this mercaptan-forming moiety upon reaction with oxidized color photographic developing agents are known as "development-inhibitor-releasing" couplers or "DIR" couplers. These DIR couplers are useful in silver halide color photography systems to reduce graininess and increase the sharpness of the image.

Figure 1:
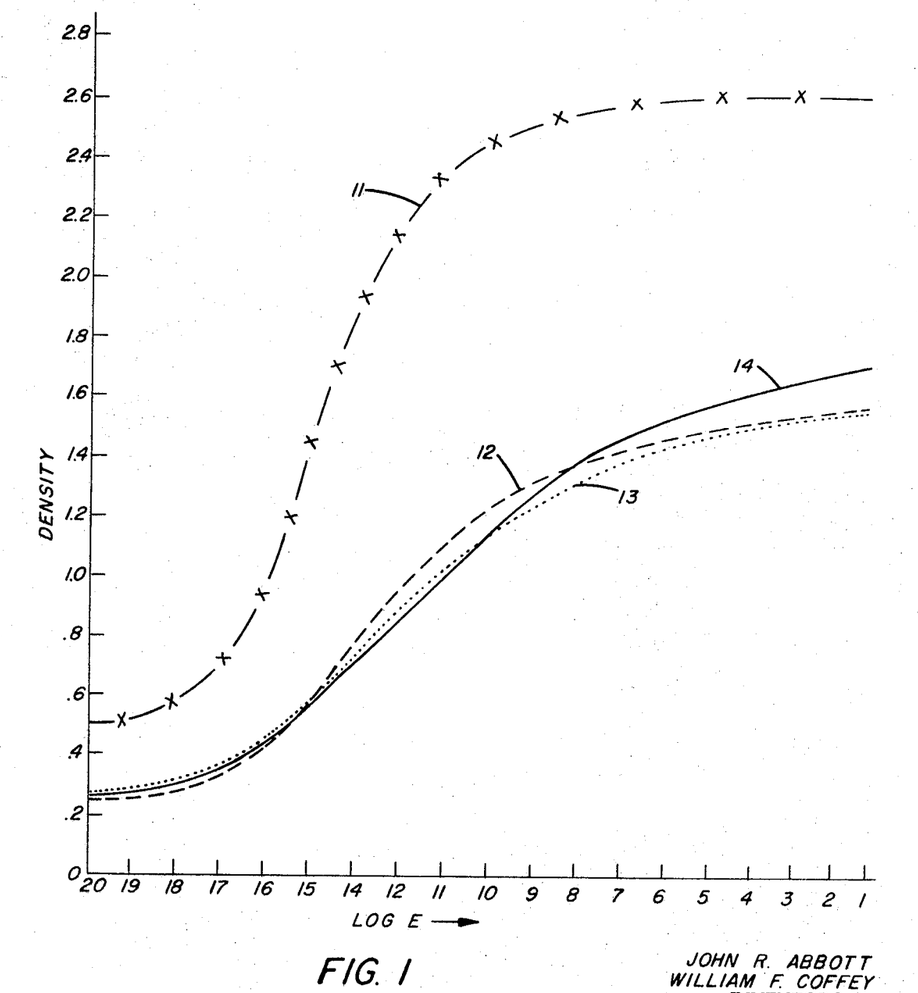

DIR couplers are generally used in conjunction with a conventional color-forming couplers (i.e., those dye-forming couplers which do not release upon reaction with color photographic developing agents a development inhibitor moiety). Many conventional dye-forming couplers are known which, when used in a photographic silver halide emulsion, exposed and processed to form color images, form these color images in linear response to the exposure to which the silver halide emulsion was subjected. When such a conventional dye-forming coupler is used in an admixture with a known 4-primary amino-substituted -5-pyrazolone DIR coupler, the result obtained is decreased contrast, some loss in speed of the silver halide emulsion and image-dye formation which is not linear to the exposure received. This is shown in FIG. 1 of the drawings where curve 11 shows the results obtained when a silver halide emulsion containing only a conventional 5-pyrazolone color coupler was sensitometrically exposed and processed for color image formation. Curve 12 shows results of similarly exposing and processing an identical silver halide emulsion containing the conventional 5-pyrazolone color coupler and in addition a 3-primary amino-4-organic monothio-substituted-5-pyrazolone coupler of the type disclosed in U.S. Pat. No. 3,227,554. Curve 13 shows the results obtained by similarly exposing and processing an identical silver halide emulsion containing the same conventional 5-pyrazolone color coupler and in addition a 3-alkoxy-4-organic monothio-substituted-5-pyrazolone coupler of the prior art such as described in U.S. Pat. No. 3,227,554. Curve 14 shows results obtained by similarly exposing and processing an identical silver halide emulsion containing the same conventional 5-pyrazolone color coupler and in addition a 3-cyclic amino-4-organic monothio-substituted-5-pyrazolone coupler of this invention. It may be seen that all three DIR color couplers (curves 12, 13 and 14) reduced the contrast and overall density of the developed image. However, it may be seen that the image produced by the coupler of this invention (curve 14) is linear in response to the exposure received over a much wider range of exposures than that obtained by the prior art DIR couplers (curves 12 and 13). The data on which FIG. 1 is based is found in example 44.

Figure 2:
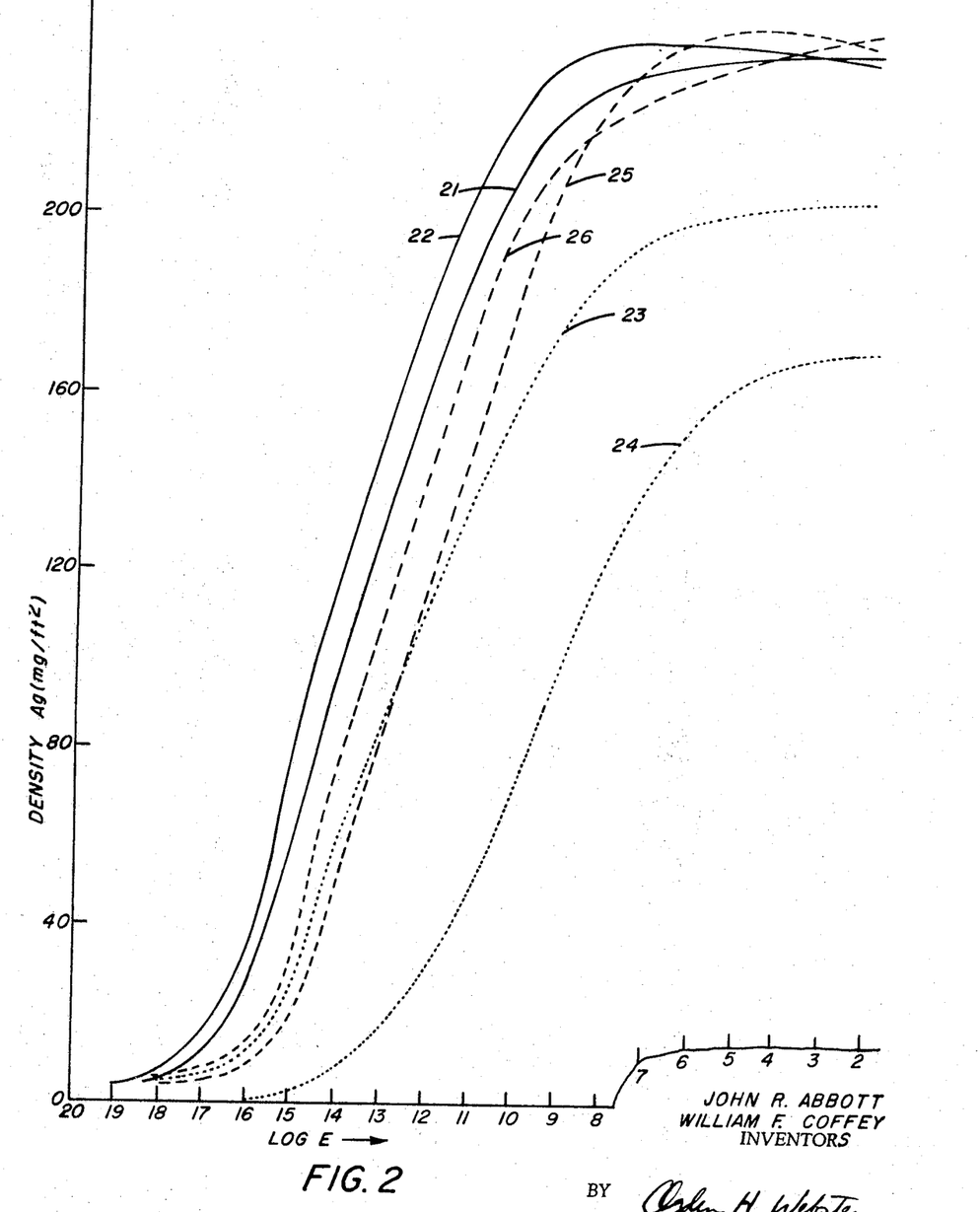

The superior stability of compounds of this invention with respect to prior art 3-primary amino-4-organic monothio-5-pyrazolone color couplers is shown in FIG. 2 of the drawings, the coordinates of which are log exposure versus milligrams of silver per square foot. Curve 21 shows the amount of developed silver obtained when a single layer gelatinous silver halide emulsion containing the conventional 5-pyrazolone color coupler used in the preceding paragraph was sensitometrically exposed and developed in Kodak D-50 developing solution to produce only a black-and-white image. Curve 22 shows the results of development of a sample identical to that used for curve 21 except this sample was incubated for one week at a temperature of 49° C. (120° F.) and relative humidity of 50 percent prior to exposure and processing. Curve 23 shows the results obtained when a similar coating containing both the conventional 5-pyrazolone coupler and the same prior art 3-primary amino-4-organic monothio-5-pyrazolone color coupler used in the preceding paragraph was sensitometrically exposed and black-and-white developed. Curve 24 shows the results of incubating a coating identical to that of curve 23. Lower maximum density values were obtained for the coatings used for curve 23 and 24 because these two emulsions contained only 220 mg. of silver halide per square foot rather than the 250 mg. per square foot used in the emulsions for curves 21, 22, 25 and 26. Curve 25 shows the results obtained when an emulsion containing both the above conventional color coupler and a 3-cyclic amino-4-organic monothio-5-pyrazolone color coupler of this invention was sensitometrically exposed and black-and-shite processed. Curve 26 shows the results obtained when an emulsion identical to that of curve 25 was incubated as above. Since all six of the above emulsions were developed with black-and-white photographic developing agent, no reaction would take place between the color couplers present and the oxidized black-and-white developer. Consequently, no coupling would take place and no elimination of the organic monothio group would occur. Therefore, any development inhibition which occurred would have to be due to development inhibitor which split off from the coupler moiety during dispersing and coating and subsequent incubation. Curves 21 and 22 represent the control samples in this figure. Curves 25 and 26 represent the results obtained from the 3-cyclic amino-4-organic monothio-5-pyrazolone of this invention. It will be noted that this color coupler does not cause a speed loss. Curves 23 and 24 represent the results obtained from a 3-primary amino-4-organic monothio-5-pyrazolone of the prior art. The difference in exposure between curve 23 and curve 24 to obtain the same silver density is approximately 0.6 Log E which is equivalent to four times the amount of exposure. It will also be noted that in addition to this speed loss a much lower maximum density was obtained after incubation with the prior art DIR coupler. This decrease in maximum density was not observed with the couplers of this invention. The 3-cyclic amino-4-organic monothio-5-pyrazolone couplers of this invention overcome both the problem of instability in the coating and the problem of lack of linear response of a silver halide emulsion containing prior art 3-primary amino-4-organic monothio-5-pyrazolone couplers. The data from which FIG. 2 was derived is presented in example 45.

In addition to the above advantages the couplers of the present invention when used in a photographic silver halide emulsion result in sharper images than those of the prior art. It is known to use DIR couplers to enhance "edge effects" within a developing layer beyond the extent to which they are obtained conventionally, i.e., by a release of halide ion from the developing grain. The attainment of a good edge effect can markedly improve sharpness of the photographic image. Edge effects result from the development of the edge of an area of high exposure to a higher density than that of the remainder of the area and the edge of the adjacent area of minimum exposure to a lower density than that of the remainder of this area. These effects are caused by the diffusion of development inhibiting byproducts such as bromide and iodide ions from the high exposure area to the low exposure area and fresh developer from the minimum exposure area to the high exposure area.

The DIR couplers increase edge effects because the development inhibitors released from the couplers are more effective than the halide ions released from the development of the silver halide crystal. The edge effect is also known as the adjacency effect.

Another aspect of the adjacency or edge effect is known as the Eberhard effect. The Eberhard effect is observed when two small areas of unequal size are given equal exposure and development. The density of this small area will be higher than the density of the large area. This effect is caused by the same lateral diffusion of fresh developer from the low-density areas to the high-density areas as that which caused the adjacency effect. Fresh developer from the low-density areas can easily pass all the way through the small high-density area while on a larger area it will only penetrate a short distance inside the high-density border. The larger area will show only adjacency effect but the overall density of the small area will be increased. Pronounced adjacency or Eberhard effects are undesirable but a small amount of either or both of these effects can increase the sharpness of the image. In table 5 of example 46 are shown the results of microdensitometric traces of the developed image obtained when emulsions containing the couplers as set forth in table 4 were given line X-ray exposures and color developed. It may be seen from the data of table 5 and the discussion following that the DIR couplers of our invention enhance the adjacency and Eberhard effects much more per unit of coupler present in the emulsion than the prior art DIR couplers.

It is seldom if ever possible to find a chemical compound which will perform all the functions desired of it perfectly. This holds true for color couplers for the subtractive photographic system. While a coupler may exhibit the proper hue it may not be as reactive as necessary or it may cause undesirable effects, for example, in the response of the silver halide emulsion to exposure to light. This is also true of the DIR couplers. Often a DIR coupler which exhibits the desired reactivity towards oxidized color developer and exhibits the desired development inhibiting effect may be unstable, may not be of the proper hue or may cause undesirable side effects in the photographic emulsion. Particularly where the DIR coupler is not of the desired hue it is necessary to use the smallest amount of this coupler possible to minimize unwanted absorption and yet obtain the development inhibition effect desired. When a class of couplers such as those represented by our coupler 30 are found which exhibit a high degree of development inhibition per unit of coupler present in the emulsion, this class of couplers represents a marked improvement in the field of photography.

When such a class of couplers not only exhibits such a high degree of development inhibition per unit of coupler but also exhibits a high degree of stability during dispersion in coating and also does not exhibit the disadvantage of nonlinear response to exposure, a very valuable class of compounds has been discovered for use in photographic silver halide emulsions. As was seen above, prior art DIR 5-pyrazolone couplers which are substituted in three position by either an alkoxy or a primary amino group exhibit certain undesirable properties. The elimination of most of the undesirable properties of the 3-alkoxy or 3-primary amino DIR 5-pyrazolone couplers was therefore unexpectedly obtained by the substitution of a 3-saturated cyclic amino group for these other three substituents.

The following examples are included for a further understanding of our invention.

EXAMPLE 1

Preparation of Coupler 1, i.e., 3-(p-methoxy-anilino)-1-phenyl-5-pyrazolone

A quantity of 6.6 ml. (0.11 mole) of glacial acetic acid is slowly added to and dissolved in 13.5 g. (0.11 mole) of p-anisidine contained in a flask equipped with a reflux condenser and cooled in an ice bath. Upon further addition of 2 g. (0.01 mole) of 3-ethoxy-1-phenyl-5-pyrazolone, the preparation is heated to, and refluxed for 2 hours at, a temperature of 140° C. The addition of 50 ml. of water rapidly causes the formation of a white solid, which is collected by filtration and recrystallized from acetonitrile; yield 2.7 g. (98 percent); m.p. 182–183°C.

EXAMPLE 2

Preparation of Coupler 2, i.e., 1-phenyl-3-toluidino-5-pyrazolone

A quantity of 6.6 ml. (0.11 mole) of glacial acetic acid is added to 11 g. (0.1 mole) of toluidine contained in a flask equipped with a reflux condenser. The mixture immediately solidifies to a white crystalline mass. Upon the further addition of 2 g. (0.01 mole) of 3-ethoxy-1-phenyl-5-pyrazolone, the preparation is heated to, and refluxed for 2 hours at, a temperature of 135° C. The resulting oil is crystallized in acetonitrile to give a white solid; yield 2.5 g. (96 percent); m.p. 218–221° C. A mixture of traces of the product and a known sample shows no melting point depression.

EXAMPLE 3

Preparation of Coupler 3, i.e., 3-n-butylamino-1-phenyl-5-pyrazolone

A quantity of 6.6 ml. (0.11 mole) of glacial acetic acid is slowly added to 8 g. (0.11 mole) of n-butylamine contained in a flask equipped with a reflux condenser. Upon the further addition of 2 g. (0.01 mole) of 3-ethoxy-1-phenyl-5-pyrazolone, the preparation is heated to, and refluxed for 90 minutes at, a temperature of 140° C. Upon cooling to room temperature, the preparation is added to an equal volume of water, from which it is caused to crystallize by scratching the walls of the vessel. It is recrystallized from toluene in the form of a white solid; yield 2.2 g. (90 percent); m.p. 120–122° C.

EXAMPLE 4

Preparation of Coupler 4, i.e., 3-(2,4-difluoranilino)-1-(2,4,6-trichlorophenyl)-5-pyrazolone A quantity of 20 ml. of methoxy ethanol is added to a mixture consisting of 39 g. (0.13 mole) of 3-ethoxy-1-(2,4,6-trichlorophenyl)-5-pyrazolone and 21 g. (0.13 mole) of 2,4-difluoraniline hydrochloride. Having been heated to and maintained for 4 hours at a temperature of 160° C., the preparation is cooled to room temperature and forms a hard mass. This mass is recrystallized from acetonitrile in the form of a white solid; yield 22.0 g. (44 percent); m.p. 200–202° C. A mixture of traces of the product and of a known sample give no melting point depression. By a prior art method, Coupler 4 is prepared at a yield of less than 1 percent.

EXAMPLE 5

Preparation of Coupler 5, i.e., 3-anilino-4-(2-benzotriazolyl)-1-phenyl-5-pyrazolone A mixture consisting of 1.5 g. (0.005 mole) of 4-(2-benzotriazolyl)-3-methoxy-1-phenyl-5-pyrazolone and 1.29 g. (0.01 mole) of aniline hydrochloride is liquefied by heating to a temperature of between 150 and 200° C. Having been maintained at the described temperature, the preparation is cooled to room temperature and forms a hard mass. This mass is heated in and filtered from boiling acetonitrile to provide Coupler 5 a light-tan solid; yield 1.5 g. (84 percent); m.p. 218–220°C.

EXAMPLE 6

Preparation of Coupler 6, i.e., 3-(o-nitroanilino)-1-phenyl-5-pyrazolone

A mixture consisting of 11 g. (0.006 mole) of o-nitroaniline hydrochloride and 12.5 g. (0.006 mole) of 3-ethoxy-1-phenyl-5-pyrazolone is heated to, and maintained for 1 hour at, a temperature of 160° C., during which time the solids liquefy to a bright red liquid. After cooling to a temperature of 60° C. and the addition of 10 ml. of methanol, the preparation crystallizes to a red solid mass, which is filtered off, washed with ether and recrystallized from acetonitrile; yield 15.5 g.; m.p. 220–221° C., (25 percent).

EXAMPLE 7

3-(p-nitroanilino)-1-(2,4,6-trichlorophenyl)-5-pyrazolone, i.e., Coupler 7, is prepared by a method analogous to those described in the preceding examples for the preparation of Compounds 1–6; yield 80 percent; m.p. 298–300° C.

EXAMPLE 8

Preparation of Coupler 13, i.e., 3-(2-chloro-5-nitroanilino)-1-(2,4,6-trichlorophenyl)

In a 350 ml., three-necked flask equipped with a magnetic stirrer and thermometer are placed 30 g. (0.1 mole) of 3-ethoxy-1-(2,4,6-trichlorophenyl)-5-pyrazolone, 17.2 g. (0.10 mole) of 2-chloro-5-nitroaniline, and 200 ml. of tetrahydrothiophene-1,1-dioxide. To this mixture 6 ml. of C.P. sulfuric acid is added. A thick precipitate is immediately formed. The mixture is heated at 160° C. in an oil bath until the disappearance of the 3-ethoxy-1-(2,4,6-trichlorophenyl)-5-pyrazolone is complete (ca3 3 hours). The dark reaction mixture is cooled and poured into 500 ml. of water. The dark brown oil which forms is separated from the water layer and added to 200 ml. of methanol. On cooling, a yellow solid is formed, which is collected by filtration and dried to constant weight. There is obtained 36.5 g. (85 percent) of a yellow crystalline solid, m.p. 274–276° C. Coupler 13 is also prepared in good yields by heating the hydrochloride of 3-ethoxy-1-(2,4,6-trichlorophenyl)-5-pyrazolone with 2-chloro-5-nitroaniline without solvent to 160° C. It is also prepared in tetrahydrothiophene dioxide with gaseous hydrogen chloride used in place of the sulfuric acid.

EXAMPLE 9

Preparation of Coupler 14, i.e., 1-(2,6-dichloro-4-nitrophenyl)-3-(2,4-dichloroanilino)-5-pyrazolone In a 300 ml., round bottomed flask equipped with a thermometer, are placed 31.8 (0.10 mole) of 1-(2,6-dichloro-4-nitro)-phenyl-3-ethoxy-5-pyrazolone and 19.8 g. (0.10 mole) of 2,4-dichloroaniline hydrochloride*. This mixture is shaken intermittently and heated in an oil bath at 90° C., resulting in softening of the solids and evolution of hydrogen chloride. The bath temperature is raised to 180–210°C., and heating of the mixture is continued until reaction is complete, as indicated by thin layer chromatography (ca 3 hours). After cooling, the brown reaction mass is dissolved in boiling acetic acid*. The solution is concentrated under reduced pressure to an oil, which solidifies on standing overnight at room temperature. This material is stirred in ether and collected; there is obtained 29.5 g. (69.5 percent) of a light brown solid, m.p. 227–229°C.

* The hydrochloride of the weakly basic 2,4-dichloroaniline is made just prior to use; it readily reverts to the free amine on contact with moisture. Use of a 10 percent excess of amine hydrochloride has been found to result in an increased yield of product.

** Some sublimation on the sides of the flask occurs. This is kept to a minimum in an oil bath.

*** An alternate method of isolating the product is to add the reaction mixture to water. The oil which separates solidifies on cooling in an icebox.

EXAMPLE 10

Coupler 8, 3-anilino-1-phenyl-5-pyrazolone, is prepared by a synthesis similar to that used to make Coupler 1 except that an equimolar amount of aniline is used in place of p-anisidine. A yield of 81 percent of Coupler 8 with m.p. of 215–218° C. is obtained.

EXAMPLE 11

Coupler 9, 3-anilino-1-(p-nitrophenyl)-5-pyrazolone, is made by a synthesis similar to that used to make Coupler 4 except that a 3-ethoxy-1(p-nitrophenyl)-5-pyrazolone and an equimolar amount of aniline hydrochloride are used in place of the intermediates used in example 4. A yield of 90 percent of Coupler 9 with m.p. of 250–252° C. is obtained.

EXAMPLE 12

Coupler 10 3-(p-methoxyanilino)-1-(p-nitrophenyl)-5-pyrazolone is made by a synthesis similar to that used to make Coupler 4 except that 3-ethoxy-1-(p-nitrophenyl)-5-pyrazolone and an equimolar amount of p-anisidine hydrochloride are used in place of the intermediates used in Example 4. A yield of 85 percent of Coupler 10 with m.p. of 239–240°C. is obtained.

EXAMPLE 13

Coupler 11, 3-anilino-1-(p-methoxyphenyl)-5-pyrazolone is made by a synthesis similar to that described for Coupler 4, except that 3-ethoxy-1-(p-methoxyphenyl)-5-pyrazolone and an equimolar amount of aniline hydrochloride are used in place of the intermediates used in Example 4. A yield of 88 percent of Coupler 11 with m.p. of 176–178° C. is obtained.

EXAMPLE 14

Coupler 12, 1-(p-methoxyphenyl)-3-(p-methoxyanilino)-5-pyrazolone is made by a synthesis similar to that described for Coupler 4, except that 3-ethoxy-1-(p-methoxyphenyl)-5-pyrazolone and an equimolar amount of p-anisidine hydrochloride are used in place of the intermediates used in Example 4. A yield of 90 percent of Coupler 12 with m.p. of 198–200°C. is obtained.

The following examples illustrate the novel synthesis of novel couplers of our invention having formulas I and II in which represents a 4 to 6 membered saturated heterocyclic group derived from a pyrrolidone, a morpholine, a piperidine, an indoline and an azetidine.

EXAMPLE 15

Preparation of Coupler 15, i.e., 3-morpholino-1-phenyl-5-pyrazolone

In a 250 cc. 3-necked flask equipped with a glass stirring bar, reflux condenser and thermometer are placed 9 g. (0.1 mole) of morpholine. Hydrogen chloride gas is passed in the morpholine until it is all solidified. Now 10 g. (0.05 mole) of 1-phenyl-3-ethoxy-5-pyrazolone is added and the mixture is heated on an oil bath at 150° C. for 1 hour. On cooling it quickly sets up solid and is recrystallized from ethyl alcohol. There is obtained 6 g. of a white solid, Coupler 15, at a 50 percent yield, m.p. 125–127° C.

EXAMPLE 16

Preparation of Coupler 16, i.e., 3-(4-methylpiperidino)-1-phenyl-5-pyrazolone

In a 3-necked 250 cc. flask equipped with a glass stirrer, reflux condenser and thermometer are placed 10 g. (6.05 mole) of 1-phenyl-3-ethoxy-5-pyrazolone and 10 g. (0.10 mole) of 4-methylpiperidine. A solution is obtained. Now the solution is saturated with dry HCl. It is heated at 130°C. for 2 hours on an oil bath. The mixture is cooled and a viscous oil is formed. This oil is crystallized in acetonitrile. There is obtained 6 g. of a white solid, Coupler 16, at a 55 percent yield, m.p. 109–110°C.

EXAMPLE 17

Preparation of Coupler 17, i.e., 1-phenyl-3-pyrrolidino-5-pyrazolone

To 87 g. (1 mole) of pyrrolidine, 60 g. (1 mole) of acetic acid is slowly added cooling in an ice bath. To the resulting mixture is added 204 g. (1 mole) of 3-ethoxy-1-phenyl-5-pyrazolone and the mixture is heated at 140° C. for 2 hours on an oil bath. On cooling, a solid precipitates and it is washed well in methanol. It is filtered and dried. There is obtained 80 g. of a white solid, Coupler 17, at a 35 percent yield, m.p. 145–148° C.

EXAMPLE 18

Preparation of Coupler 18, i.e., 1-(p-nitrophenyl)3-pyrrolidino-5-pyrazolone

To 87 g. (1 mole) of pyrrolidine, 60 g. (1mole) of acetic acid is slowly added with cooling in an ice bath. To the resulting mixture is added 233 g. (1 mole) of 3-ethoxy-1-(p-nitrophenyl)-5-pyrazolone and the mixture is heated at 130° C. for one hour. On cooling a solid precipitates and it is washed well in ethanol. It is filtered and dried. There is obtained 140 g. of a golden orange solid, Coupler 18, at 18, 51 percent yield, m.p. 187–189° C.

EXAMPLE 19

Preparation of Coupler 19, i.e., 3-indolino-1phenyl-5-pyrazolone

In a three-necked 250 cc. flask equipped with a glass stirrer, reflux condenser and thermometer are placed 10 g. (0.05 mole) of 3-ethoxy-1-phenyl-5-pyrazolone and 12 g. (0.10 mole) of indoline. The mixture is stirred and saturated with HCl gas. The mixture is heated on an oil bath at 150° C. for 2 hours. Upon cooling, the mixture sets up solid. The solid is recrystallized from ethyl alcohol to give 5 g. of a light tan solid, Coupler 19, at a 42 percent yield, m.p. 209–211°C.

EXAMPLE 20

Coupler 20, i.e., 1-(2-benzothiazolyl)-3-pyrrolidino-5-pyrazolone, is made by a method similar to that used to make Coupler 17 expecting that equimolar amounts of 1-(2-benzothiazolyl)-3-ethoxy-5-pyrazolone and pyrrolidine are used in place of the reactants used to make Coupler 17.

EXAMPLE 21

Coupler 21, i.e., 3-morpholino-4-methylthio-5-pyrazolone, is prepared by a method similar to that described for Coupler 17, except that equimolar amounts of 3-ethoxy-4-methylthio-5-pyrazolone and morpholine are used instead of the reactants used to make Coupler 17.

EXAMPLE 22

Coupler 22, i.e., 1-{4-[a-(2,4,-di-tert-amylphenoxy)-propionamido]-phenyl}-3-pyrrolidine-5-pyrazolone is advantageously made by heating to about 130° C. a mixture of (1)1-{4-[a-(2,4-di-tert-amylphenoxy)-propionamido]-phenyl} -3-ethoxy-5-pyrazolone, (2) pyrrolidine, and (3) acetic acid.

EXAMPLE 23

Coupler 23, i.e., 3-indolino-1-phenyl-4-thiocyano-5-pyrazolone, is made by a method similar to that described for Coupler 16 except that equimolar amounts of 3-ethoxy-1-phenyl-4-thiocyano-5-pyrazolone and indoline are used instead of the reactants used to make Coupler 16.

EXAMPLE 24

Coupler 24, i.e., 4-acetoxy-3-pyrrolidino-5-pyrazolone, is prepared by a method similar to that used to make Coupler 16, except that equimolar amounts of 4-acetoxy-3-ethoxy-5-pyrazolone and pyrrolidine are used as the reactants instead of those used to make Coupler 16.

EXAMPLE 25,

Coupler 25, i.e., 1-methyl-3-morpholino-4-thiophenyl-5-pyrazolone, is prepared by a method similar to that used to make Coupler 17 excepting that equimolar amounts of 3-ethyloxy-1-methyl-4-thiophyenyl-5-pyrazolone and morpholine are used instead of the reactants used to make Coupler 17.

EXAMPLE 26

Coupler 26, i.e., 3-(4-methylpiperidino)-1-phenyl-4-(1-phenyl-5-tetrazolylthio)-5-pyrazolone, is made by a synthesis similar to that used to make Coupler 16 expecting that equimolar amounts of 3-ethoxy-1-phenyl-4-(1-phenyl-5-tetrazolylthio)-5-pyrazolone and piperidine are used instead of the reactants used to make Coupler 16.

EXAMPLE 27

Coupler 27, i.e., 4-(2-benzyltriazolyl)-3-piperidino-5-pyrazolone, is made by a synthesis similar to that used to make Coupler 16 excepting that equimolar amounts of 4-(2-benzyltriazolyl)-3-ethoxy-5-pyrazolone and pyrrolidone are used instead of the reactants used to make Coupler 16.

EXAMPLE 28

Coupler 28, i.e., 1-methyl-3-morpholino-4-(2-octadecoylamidophenylazoxy)-5-pyrazolone, is made by a method similar to that used to make Coupler 16 excepting that equimolar amounts of 3-ethoxy-1-methyl-4-(2-octadecoylamidophenylazoxy)-5-pyrazolone and morpholine are used in place of the reactants used to make Coupler 16.

EXAMPLE 29

Coupler 29, i.e., 3-morpholino-1-{4-[α-(3-pentadecylphenoxy)-propionamido]-phenyl}-5-pyrazolone is advantageously prepared by heating to about 130° C. a mixture of (1) 3-ethoxy-1-{4-[α-(3-pentadecylphenoxy)-propionamido]-phenyl}-5-pyrazolone, (2) morpholine and (3) acetic acid.

EXAMPLE 30

STEP A: Coupler 30, i.e., 1- 4-[α-(2,4-di-tert-amylphenoxy)-butyramido]-phenyl -3-(1-pyrrolidino)-4-(1-phenyl-5-tetrazolylthio)-5-pyrazolone, is prepared by the following procedure.

To 130 grams (1.67 moles) of pyrrolidine cooled in ice water is added, with fuming, 130 milliliters of glacial acetic acid slowly from a dropping funnel. This pyrrolidine acetic acid mixture is then added to 130 grams (0.56 moles) of 1-(p-nitrophenyl)-3-ethoxy-5-pyrazolone in a 500 milliliter three-necked flask equipped with thermometer, reflux condenser, and magnetic stirrer. A viscous red mixture results which is heated with stirring at a temperature of 120–140° C. for 1 hour. Solution of all solids is effected at a temperature of between 80 and 90° C. The reaction mixture is thereupon cooled to room temperature, the resulting solid is added to 1,500 milliliters of ethyl alcohol and stirred for 15 minutes. The resulting solid is collected by filtration, washed with fresh ethyl alcohol and dried. There is obtained 108 grams (70.5 percent yield) of a golden orange solid, 1-(p-nitrophenyl)-3-pyrrolidino-5-pyrazolone, m.p. 187–189° C., which can be used in Step B without further purification.

STEP B: In a 2-liter Parr bottle is placed 68 grams (0.25 mole) of 1-(p-nitrophenyl)-3-pyrrolidino-5-pyrazolone (prepared in the preceding step), 1,200 milliliters of ethyl alcohol, and palladium on charcoal catalyst. The mixture is hydrogenated on a Parr apparatus; the theoretical pressure drop of 30 p.s.i. is observed within 45 minutes. The reduction mixture is transferred under nitrogen to a 5-liter flask and 1,500 milliliters of ethyl alcohol is added to dissolve the solid material which is present. The mixture is heated to boiling and the solids dissolve. The catalyst is removed by filtration through a supercell pad, and filtrate cooled. The tan crystalline solid which forms is collected and dried. The filtrate, when concentrated one-fourth of the volume, yields a second crop of crystals which is added to the first crystal crop. Total yield of product, 1-(p-aminophenyl)-3-pyrrolidino-5-pyrazolone, m.p. 198–200° C., is 49.5 grams (82 percent).

STEP C: In a 3-liter, three-necked flask equipped with stirrer, a reflux condenser and thermometer is placed 49.5 grams (0.20 mole) OF 1-(p-aminophenyl)-3-pyrrolidino-5-pyrazolone (prepared in Step B) and 1,500 milliliters of acetonitrile. The solids dissolve upon heating the mixture to boiling whereupon 70 grams (0.20 moles) of α-(2,4-di-tert-amylphenoxy)butyryl chloride in 300 milliliters of acetonitrile is added rapidly to the stirred solution. A white precipitate forms immediately and toward the end of the addition the mixture becomes thick but still stirrable. Hydrogen chloride is evolved during the addition. The mixture is refluxed for 1 hour, cooled and the off-white solid is collected by filtration and washed with cold acetonitrile. The off-white solid is suspended in hot acetone, recollected and dried in an oven. There is obtained 110 grams (97.5 percent yield) of a nearly white solid 1-{4-[α-(2,4-di-tert-amylphenoxy)butyramido]-phenyl}-3-pyrrolidino-5-pyrazolone, m.p. 197–200° C., which can be used in Step D without further purification.

STEP D: A mixture of 1-phenyl-2-tetrazoline-5-thione, 62.4 grams (0.35 mole) (previously recrystallized from a mixture of 95 percent ethyl alcohol and 5 percent benzene) and 500 milliliters of carbon tetrachloride is distilled dry by distilling off 75 milliliters of carbon tetrachloride. Chlorine gas is bubbled into this mixture in a flask fitted with a drying tube, s stirrer and a gas inlet tube after which all the solids have dissolved. The solution is concentrated to three-fourths of its original volume under vacuum at a water bath temperature of 30–35° C. in a flask fitted with a stirrer and thermometer. Then 192 grams (0.35 mole) of 1-{4-[α-(2,4-di-tert-pentalphenoxy)butyramido]-phenyl}-3-pyrrolidino-5-pyrazolone, (prepared in Step C) dissolved in 300 milliliters of chloroform (dried by distilling off one-tenth of the original volume) is added rapidly to carbon tetrachloride solution of sulfenyl chloride (prepared above). There is a slight darkening of the solution but almost immediately the color lightens. No exotherm is observed during the addition but large quantities of hydrogen chloride are evolved. The stirring is continued for 15 minutes at which time the mixture is filtered and concentrated under vacuum into a volume of 450 milliliters. The concentrate is added in portions (to prevent separation of the product as a gum or oil) to ligroine (b.p. 35–60° C.) and a solid crystallizes which is collected by rapid filtration. Since the light cream solid will turn blue in air the exposure to air must be held to a minimum. The solid is ground to a powder with mortar and pestle and dried in a vacuum oven. There is obtained 268 grams (99 percent yield) of a light cream-colored solid, Coupler 30, m.p. 136–138° C.

EXAMPLE 31

Coupler 31, i.e., 1-{4-[α-(2,4-di-tert-amylphenoxy)-butyramido]-phenyl}-3-morpholino-4-(1-phenyl-5-tetrazolylthio)-5-pyrazolone is prepared by heating for 1 p hour at 140° C., a solution of 50 grams (0.6 mole) of morpholine and 25 grams (0.11 mole) of 1-(p-nitrophenyl)-3-ethoxy-5-pyrazolone which is saturated with anhydrous hydrogen chloride from time to time. The reaction mixture is cooled to room temperature and the resulting solid is crystallized from ethyl alcohol to yield 25 grams (88 percent) of a light orange solid, 1-(p-nitrophenyl)-3-morpholino-5-pyrazolone, m.p. 205–207° C. This first intermediate then is reacted according to the method of example 30 excluding Step A to obtain a product (Coupler 31) which melts at 125° C.

EXAMPLE 32

Coupler 32, i.e., 1-{4-[α-(2,4-di-tert-amylphenoxy)-butyramido]-phenyl}-3-(1-pyrrolidino)-4-(2-benzothiaolylthio)-5-pyrazolone is prepared by a method similar to that used to make Coupler 30 except that in Step D 17.0 grams (0.1 mole) of mercaptobenzothiazole is chlorinated in dry carbon tetrachloride, heated to reflux which effectuates solution of all solids. 1-{4-[α-(2,4-di-tert-amylphenoxy)-butyramido]-phenyl}-3-(1-pyrrolidino)-5pyrazolone (54.6 grams) dissolved in chloroform is added to the carbon tetrachloride solution of chloride of mercaptobenzothiazole. Following stirring for an additional 10 minutes. 90 percent of the solvent was removed under vacuum and the concentrate added in portions to ligroine (b.p. 35–60° C.) and the white solid collected by rapid filtration is dried in a vacuum over to yield 70 grams of Coupler 32, m.p. 155–157° C. (99 percent yield).

EXAMPLE 33

Coupler 33, i.e., 1-{2,6-dichloro-4-[α-(4-hydroxy-3-tert-butylphenoxy)-tetradecamido]-phenyl}-3-indolino-4 -(1-phenyl-5-tetrazolylthio)-5-pyrazolone is prepared by a method similar to that use to make Coupler 30 excepting that equal molar amounts of 1-(2,6-dichloro-4-nitro)-phenyl-3-ethoxy-5-pyrazolone and indoline are used in place of the reactants used to make Coupler 30.

EXAMPLE 34

Coupler 34, i.e., 1-{4-[α-(3-pentadecylphenoxy)-butyramido]-phenyl}-3-(4-methylpiperidino)-4-(2-benzothiazolylthio)-5-pyrazolone is prepared by a method similar to that used to make Coupler 32 excepting that 1-(4-nitrophenyl)-3-methoxy-5-pyrazolone and 4-methylpiperidino are used in place of the reactants used to make Coupler 32.

EXAMPLE 35

Coupler 35, i.e., 1-phenyl-3-(4-octadecylpiperidino)-4-(5-phenyl-1,3,4-oxadiazolyl-2-thio)-5-pyrazolone is prepared by a method similar to that used to make Coupler 30 excepting that equal molar amounts of 1-phenyl-3-ethoxy-5-pyrazolone, 5-phenyl-1,3,4-oxadiazolyl-2-thione and 4-octadecylpiperidine are used in place of the reactants used to make Coupler 30.

EXAMPLE 36

Coupler 36, i.e., 3-morpholino-1-{4-[α-(3-(ω-sulfopentadecyl)-phenoxy)-propionamido]-phenyl}-5-pyrazolone is advantageously prepared by heating to about 140° C. a mixture of (1) 3-ethoxy-1-{4-[α-(3-(ω-sulfopentadecyl)-phenoxy)-propionamido]-phenyl}-5-pyrazolone, and (2) morpholine hydrochloride.

EXAMPLE 37

Coupler 37, i.e., 3-indolino-4-stearoyloxy-1-(4sulfophenyl)-5-pyrazolone is advantageously prepared by heating to about 140° C. a mixture of (1) 3-ethoxy-4-stearoyloxy-1-(4-sulfonphenyl)-5-pyrazolone, (2) indoline, and (3) glacial acetic acid.

EXAMPLE 38

Coupler 38, i.e., 4,4-bis(1-phenyl-3-pyrrolidino-5-pyrazolone is advantageously made by heating a mixture of .1 mole of 4,4-bis(3-methoxy-1-phenyl-5-pyrazolone), .2 mole of pyrrolidine and .2 mole of glacial acetic acid. The 4,4-bis-(3-methoxy-1-phenyl-5-pyrazolone) is advantageously made by heating 3-methoxy-1-phenyl-5-pyrazolone with a mild oxidizing agent such as phenyl hydrazine, nitrous acid, t-butyl hydroperoxide in a well-known synthesis.

EXAMPLE 39

Coupler 39, i.e., 4,4-methylidyne bis(1-phenyl-3-piperidino-5-pyrazolone) is advantageously prepared by heating a mixture of 0.1 mole of 4,4-methylidyne bis(3-methoxy-1-phenyl-5-pyrazolone), 0.2 mole of piperidine and 0.2 mole of glacial acetic acid. The 4,4-methylidyne bis(3-methoxy-1-phenyl-5-pyrazolone) is advantageously prepared by well-known synthesis, such as, by heating a mixture of equimolar amounts of 3-ethoxy-1-phenyl-5-pyrazolone and 3-ethoxy-4-formyl-1-phenyl-5-pyrazolone.

EXAMPLE 40

Coupler 40, i.e., 4,4-methylenebis(3morpholino-1-phenyl-5-pyrazolone) is advantageously prepared by heating a mixture of 0.1 mole of 4,4-methylenebis(3-ethoxy-1-phenyl-5-pyrazolone), 0.2 mole of morpholine and 0.2 mole of glacial acetic acid. The 4,4-methylenebis(3-ethoxy-1-phenyl-5-pyrazolone) is synthesized by well-known synthesis, such as, by heating (under reflux) a mixture of equimolar amounts of 3-ethoxy-1-phenyl-5-pyrazolone and 4-acetyl-3-ethoxy-1-methyl-2-phenyl-5-pyrazolone.

EXAMPLE 41

Coupler 41, i.e., 2,6-{bis-[4-(1-phenyl-3-pyrrolidino-5-pyrazolone)]}-benzo[1,2-d: 4,5-d']bistriazole is advantageously prepared by heating a mixture of .1 mole of 2,6-{bis-[4-(3-ethoxy-1-phenyl-5-pyrazolone)]} benzo [1,2-d: 4,5-d']bistriazole, .2 mole of pyrrolidine and .2 mole of glacial acetic acid. The 2,6-{bis[4-(3-ethoxy-1-phenyl-5-pyrazolone)]}benzo[1,2-d: 4,5-d']bistriazole is advantageously prepared as described below. Equimolar amounts of 3-ethoxy-1-phenyl-5-pyrazolone and 2,4,5-trinitrophenyl diazonium chloride are reacted in the presence of pyridine, methanol and sodium acetate to form 3-ethoxy-1-phenyl-4-(2,4,5-trinitrophenylazo)-5-pyrazolone which is then reduced with zinc dust and sodium hydroxide in aqueous alcohol to give 3-ethoxy-1-phenyl-4-[2-(5,6-dinitrobenzotriazolyl)]-5-pyrazolone. The 3-ethoxy-1-phenyl-4-[2-(5,6-dinitrobenzotriazolyl)]-5-pyrazolone is heated with sodium sulfide in methanol to form 3-ethoxy-1-phenyl-4-[2-(5-amino-6-nitrobenzotriazolyl)]-5-pyrazolone which is then diazotized by treating with cold nitrous acid in hydrochloric acid. Equimolar amounts of this diazonium salt and 3-ethoxy-1-phenyl-5-pyrazolone are contacted in the presence of pyridine, methanol and sodium acetate to prepare 3-ethoxy-1-phenyl-4-{2-[5-(3-ethoxy-1-phenyl-5-pyrazolonyl)azo]-6-nitrobenzotriazolyl}-5-pyrazolone which is then reduced with zinc dust and sodium hydroxide in aqueous alcohol to give 2,2-{bis-[4-(3-ethoxy-1-phenyl-5-pyrazolone)]} benzo [1,2-d: 4,5-d']bistriazole.

These and still other couplers of our invention having formulas I and II are valuable for use in color photography and are made by our synthesis.

The intermediate couplers of formula III when $R_3$ is hydrogen are advantageously prepared by the synthesis described by Porter et al. in U.S. Pat. No. 2,439,098 issued Apr. 6, 1948. In this synthesis a compound having the formula $RNHNH_2$ and a compound having the formula:

are heated in the presence of sodium ethylate in ethanol to form the corresponding 3-alkoxy-5-pyrazolone wherein R and $R_5$ are as defined herein previously.

3-Ethoxy-1-phenyl-5-pyrazolone (used in making our couplers 1, 2, 3, 6, 8, 15, 16, 17 and 19) is Coupler No. 1 shown in Column 2 of U.S. Pat. No. 2,439,098.

3-Ethoxy-1-(4-nitrophenyl)-5-pyrazolone (used in making our couplers 9, 10 and 18) is Coupler No. 3 shown in Column 2 of U.S. Pat. No. 2,439,098.

1-(2-Benzothiazolyl)-3-ethoxy-5-pyrazolone (used in making our coupler 20) is Coupler No. 5 shown in Column 3 of U.S. Pat. No. 2,439,098.

3-Ethoxy-1-(2,4,6-trichlorophenyl)-5-pyrazolone (used in making our couplers 4, 7 and 13), 1-(2,6-dichloro-4-nitro)phenyl-3-ethoxy-5-pyrazolone (used in making our coupler 14), and 3-ethoxy-1-(4-methoxyphenyl)-5-pyrazolone (used to make our couplers 11 and 12) are made by the method described in U.S. Pat. No. 2,439,098 in which ethyl β, β-diethoxyacrylate is reacted with 2,4,6-trichlorophenylhydrazine, 2,6-dichloro-4 -nitrophenylhydrazine and 4-methoxyphenylhydrazine, respectively.

1-{4-[α-(2,4-di-t-amylphenoxy)-propionamido]-phenyl}-3-ethoxy-5-pyrazolone (used to make our coupler 22) is advantageously made by reducing 3-ethoxy-1-(4-nitrophenyl)-5-pyrazolone by well-known catalytic hydrogenation to 1-(4-aminophenyl)-3-ethoxy-5-pyrazolone and then subsequently reacting the amino derivative with α-(2,4-di-t-amylphenoxy)-propionyl chloride.

3-Ethoxy-1-{4[α-(3-pentadecylphenoxy)-propionamido]phenyl}-5-phrazolone (used to make our coupler 29) is prepared by a reaction similar to that described in the preceding paragraph except that α-(3-pentadecylphenoxy)-propionyl chloride is used in place of the acid chloride used therein.

3-Ethoxy-1-{4-[α-(3-(ω-sulfopentadecyl)-phenoxy)-propionamido]-phenyl}-5-pyrazolone (used to prepare our coupler 36) is prepared by a reaction similar to that described in the paragraph before last except that α-[3-(ω-sulfopentadecylphenoxy)]-propionyl chloride is used in place of α-(2,4-di-tert-amylphenoxy)-propionyl chloride.

The synthesis of typical coupler intermediates of Formula III when $R_3$ is other than hydrogen as described below.

4-(2-Benzotriazolyl)-3-methoxy-1-phenyl-5-pyrazolone (used as the coupler intermediate to make our coupler 5) is advantageously prepared by contacting 3-methoxy-1-phenyl-5-pyrazolone with 2-nitrophenyldiazonium chloride in the presence of pyridine, methanol and sodium acetate to produce 3-methoxy-4-(2-nitrophenylazo)-1-phenyl-5-pyrazolone which is subsequently reduced with zinc dust and sodium hydroxide in aqueous methanol to give 4-(2-benzotriazolyl)-3-methoxy-1-phenyl-5-pyrazolone; 3-methoxy-1-phenyl-5-pyrazolone is made by reacting phenylhydrazine with ethyl β,β-dimethoxyacrylate by the synthesis of U.S. Pat. No. 2,439,098.

4-(2-Benzotriazolyl)-3-ethoxy-5-pyrazolone (used to make our coupler 27) is advantageously made by a method similar to that described for making 4-(2-benzotriazolyl)-3-methoxy-1-phenyl-5-pyrazolone excepting that 3-ethoxy-5-pyrazolone is used in place of 3-methoxy-1-phenyl-5-pyrazolone.

3-Ethoxy-4-methylthio-5-pyrazolone (used to make our coupler 21) is made by reacting 3-ethoxy-1-phenyl-5-pyrazolone and p-methylthiosulfonyltoluene in aqueous ethanol containing sodium acetate.

3-Ethoxy-1-methyl-4-phenylthio-5-pyrazolone (used to make our coupler 25) is made by heating a mixture of 3-ethoxy-1-phenyl-5-pyrazolone and phenyl sulfonyl chloride in acetonitrile to a temperature of 80° C. for 5 minutes.

3-Ethoxy-1-phenyl-4-thiocyano-5-pyrazolone (used to make coupler 23) is advantageously made as follows: ammonium thiocyanate in acetic acid is treated with bromine in acetic acid and then 3-ethoxy-1-phenyl-5-pyrazolone is added with stirring at room temperature.

4-Acetoxy-3-ethoxy-5-pyrazolone (used to make our coupler 24) is advantageously made by heating a solution of 4-diazonium-3-ethoxy-5-pyrazolone and fluoroboric acid in glacial acetic acid. 4-Diazonium-3-ethoxy-5-pyrazolone is made by the following series of reactions: 3-ethoxy-5-pyrazolone is reacted under reflux with 4-nitrosodimethylaniline in ethanol containing sodium carbonate solution to produce 4-(4-dimethylaminophenylimino)-3-ethoxy-5-pyrazolone. A solution of 4-(4-dimethylaminophenylimino)-3-ethoxy-5-pyrazolone in ethyl ether is treated with aqueous sulfuric acid to produce 3-ethoxy-4-keto-5-pyrazolone which is isolated by crystallization from the ether layer. A warm solution of the recrystallized 3-ethoxy-4-keto-5-pyrazolone in glacial acetic acid is added to a solution of hydrazine hydrate in glacial acetic acid to produce 3-ethoxy-4-hydrazono-5-pyrazolone. A mixture of 3-ethoxy-4-hydrazono-5-pyrazolone, yellow mercuric oxide and anhydrous sodium sulfite in ethyl ether is added to a saturated alcoholic potassium hydroxide solution and agitated at room temperature to produce 4-diazonium-3-ethoxy-5-pyrazolone. Similarly other 1-substituted-3-alkoxy-5-pyrazolones are converted to the corresponding -4-acyloxy substituted-5-pyrazolones by this synthesis route as described in Columns 9 and 10 of Loria U.S. Pat. No. 3,311,476.

The 3-ethoxy-4-stearoyloxy-1-(4-sulfophenyl)-5-pyrazolone (used to make our coupler 37) is prepared by the method of the preceding paragraph excepting that 3-ethoxy-1-(4-sulfophenyl)-5-pyrazolone is used in place 3-ethoxy-5-pyrazolone and stearic acid is used in place of glacial acetic acid in the last step of the synthesis.

3-Ethoxy-1-phenyl-4-(1-phenyl-5-tetrazolythio)-5-pyrazolone (used in making our coupler 26) is advantageously prepared by adding 3-ethoxy-1-phenyl-5-pyrazolone to a chloroform solution of 1-phenyltetrazole-5-sulfenyl chloride. The 1-phenyltetrazole-5-sulfenyl chloride is advantageously made by treating a suspension of 5-mercapto-1-phenyl-tetrazole in carbon tetrachloride with chlorine gas.

3-Ethoxy-1-methyl-4-(2-octadecylamidophenylazoxy)-5-pyrazolone (used to make our coupler 28) is advantageously made by contacting 2-octadecylamidophenyldiazonium chloride with 3-ethoxy-1-methyl-5-pyrazolone. The 3-ethoxy-1-methyl-4-(2-octadecylamidophenylazo)-5-pyrazolone formed is then converted to 3-ethoxy-1-methyl-4-(2-octadecylamidophenylazoxy)-5-pyrazolone by oxidation with nitrous acid or t-butylhydroperoxide.

Our couplers are used in the color development of photographic hydrophilic colloid silver halide emulsion layers of the developing-out type either in the color developer solution or in the emulsion layer. The emulsions can contain silver chloride, silver bromide, silver iodide, silver chlorobromide, silver bromoiodide, silver chlorobromoiodide, etc., as the light-sensitive material.

Any of the hydrophilic colloids used in photographic emulsion layers are used to advantage in our emulsions including gelatin, colloidal albumin, cellulose derivatives, synthetic resins, etc. The emulsions contain any of the addenda used in photographic emulsions including hardening agents, chemical sensitizing agents, spectral sensitizing agents, stabilizing agents, etc.

The above-described emulsions can be coated on a wide variety of photographic emulsion supports. Typical supports include cellulose nitrate film, cellulose acetate film, polyvinyl acetal film, polystyrene film, poly(ethylene terephthalate) film, polyethylene film, polypropylene film, and related films of resinous materials, as well as paper, polyethylene-coated paper, glass and others.

The diffusible couplers of our invention such as 1 through 21, and 23 through 27 are advantageously used in developing solutions for color developing photographic elements that do not contain incorporated couplers. Color developers containing any of the well known primary aromatic amino color-forming silver halide developing agents, such as, the phenylenediamines, e.g., diethyl-p-phenylenediamine hydrochloride, monomethyl-p-phenylenediamine hydrochloride, dimethyl-p-phenylenediamine hydrochloride, 2-amino-5-diethylaminotoluene hydrochloride, 2-amino-5(N-ethyl-N-lauryl)toluene, N-ethyl-β-methanesulfonamidoethyl-3-methyl-4-aminoaniline sulfate, N-ethyl-β-methanesulfonamidoethyl-4-aminoaniline, 4-N-ethyl-N-β-hydroxyethylaminoaniline, etc., the p-aminophenols and their substitution products where the amino group is unsubstituted may be used in the alkaline developer solution with our couplers. Various other materials can be included in the developer solutions depending upon the particular requirements, for example, an alkali metal sulfite, carbonate, bisulfite, bromide, iodide, etc., and the thickening agents used in viscous developer compositions such as are described in Whitmore and Mader U.S. Pat. No. 3,227,550, Columns 35 and 36. The following is a typical developer solution given to illustrate but not limit the invention.

| | |
|---|---|
| 2-amino-5-diethylaminotoluene HCl | 2.0 g. |
| Sodium sulfite (anhydrous) | 2.0 g. |
| Sodium carbonate (anhydrous) | 20.0 g. |
| Potassium bromide | 1.0 g. |
| Coupler | 2.0 g. |
| Water to 1,000.0 ml. | |

The nondiffusible couplers of our invention such as 22 and 28 through 41 are used to advantage in photographic silver halide emulsion layers. Couplers 36 and 37 are advantageously incorporated as Fischer-type couplers, while the other nondiffusible couplers are incorporated in emulsion layers by methods such as are described by Mannes et al. U.S. Pat. No. 2,304,939, issued Dec. 15, 1942, Jelley et al. U.S. Pat. No. 2,322,027, issued June 15, 1943, etc., in which high-boiling organic solvents are used to dissolve the coupler, and by methods described in Vittum et al. U.S. Pat. No. 2,801,170, and Fierke et al. U.S. Pat. No. 2,801,171, both issued July 30, 1957, and Julian U.S. Pat. No. 2,949,360, issued Aug. 16, 1960 in which low-boiling or water-soluble organic solvents are used with or in place of the high-boiling solvent.

EXAMPLE 42

This example shows a typical processing procedure for the color developing of photographic elements that do not contain incorporated couplers. The color photographic developer contains a diffusible coupler of our invention. Four pieces of a photographic element comprising a cellulose acetate film support coated with a gelatin silver bromide emulsion layer are given identical exposure to a graduated density test object and then given identical processing as follows except as to the coupler in the color developer. The processing solutions and wash are at 75° F.

| Processing Step | Time in Minutes |
| --- | --- |
| Black and White Development | 7 |
| Wash | 1 |
| Fixing (1st) | 10 |
| Wash | 1 |
| Rehalogenation | 5 |
| Wash | 1 |

| Processing Step | Time in Minutes |
| --- | --- |
| Expose to room light | |
| Color development | 10 |
| Wash | 1 |
| Fixing (2nd) | 10 |
| Bleaching | 10 |
| Fixing (3rd) | 10 |
| Wash | 5 |

A conventional black and white aqueous alkaline developer solution containing p-methylaminophenol sulfate, hydroquinone, alkali metal sulfite is used. The 1st fixing bath has the following composition:

| | |
| --- | --- |
| Sodium sulfite | 3.96 g. |
| Sodium bisulfite | 2.58 g. |
| Ammonium thiosulfate | 91.50 g. |
| Potassium iodide | 2.00 g. |
| Water to | 1.00 l. |

The rehalogenation is done with a solution having the following composition:

| | |
| --- | --- |
| Potassium ferricyanide | 50.0 g. |
| Potassium bromide | 17.0 g. |
| Water to | 1.0 l. |

A conventional aqueous sodium thiosulfate fixing bath is used for the 2nd and 3rd fixing steps. A conventional alkali metal ferricyanide and bromide bleach is used. The color developer used has the following composition with the coupler indicated in table 1.

| | |
| --- | --- |
| N,N-Diethyl-p-phenylenediamine HCl | 3.6 g. |
| Potassium bromide | 1.0 g. |
| Tribasic potassium phosphate (anhydrous) | 13.25 g. |
| Sodium sulfite | 0.65 g. |
| Dimethylformamide | 10 ml. |
| Coupler | $5 \times 10^{-3}$ mole |
| Water to | 1 liter |

The following table 1 summarizes the $\lambda$max. values for the magenta dye images formed in the processed pieces of photographic element by the indicated couplers of our invention.

TABLE 1

| Coupler | | $\lambda$Max. in m. |
| --- | --- | --- |
| 16 | 3-(4-methylpiperidino)-1-phenyl-5-pyrazolone | 516 |
| 19 | 3-indolino-1-phenyl-5-pyrazolone | 516 |
| 15 | 3-morpholino-1-phenyl-5-pyrazolone | 520 |
| 17 | 3-pyrrolidino-1-phenyl-5-pyrazolone | 507 |

In each instance our coupler produced a good magenta dye image.

Similar results are obtained when example 42 is repeated with other diffusible couplers of our invention, such as, 1 through 1, 23 through 27.

EXAMPLE 43

This example shows a typical processing procedure for color developing photographic elements that contain incorporated nondiffusible couplers. A solution of 1--{4-[α-(2,4-di-t-amylphenoxy)-propionamido]phenyl}-3-pyrrolidino-5-pyrazolone (coupler 22) in dibutyl phthalate is made and dispersed in a gelatin silver bromoiodide emulsion. The emulsion is coated on a cellulose acetate film support. The dried emulsion coating is sensitometrically exposed and developed in an aqueous alkali color developer solution containing N-ethyl-β-methanesulfonamidoethyl-3-methyl-4-aminoaniline sulfate to form a negative silver and magenta dye image reproduction of the sensitometric exposure. After removal of the silver image and residual silver halide by treating in a conventional alkali metal ferricyanide bleach bath and a conventional alkali metal thiosulfate fixing bath, a good magenta dye image is left in the emulsion layer.

Similarly good nondiffusible magenta dye images are produced when example 43 is repeated using other nondiffusible Couplers 28 through 36 and 38 through 41 of our invention. The diffusible magenta dye image produced by color development of a photographic emulsion layer containing our coupler 37 is advantageously transferred during the color development step to a receiving sheet comprising a cellulose acetate film support coated with a gelatin layer containing a mordant for acid dyes.

The following examples compare the results obtained using couplers of our invention and prior art 5-pyrazolone couplers in photographic silver halide emulsions.

EXAMPLE 44

Samples of four supported single layer gelatinous silver halide emulsion coatings each containing per square foot of coating 200 milligrams of silver bromoiodide, 213 milligrams gelatin, and magenta dye-forming couplers are shown in table 2, were sensitometrically exposed through a graduated density test object and processed by the procedure of example 43. The results expressed as density versus log exposure are contained in FIG. 1.

TABLE 2

| Coating | Couplers (mg./ft.$^2$) | | | |
| --- | --- | --- | --- | --- |
| | A | B | C | 30 |
| 11 | 77 | | | |
| 12 | 77 | 6.5 | | |
| 13 | 77 | | 12 | |
| 14 | 77 | | | 4 |
| | (0.0114 | 0.0084 | 0.016 | 0.0055)* |

Coupler A is 1-2,4,6-trichlorophenyl)-3-{3-[α-(2,4-di-tert-amylphenoxy)-acetamido]-benzamido}-5-pyrazolone. This is a conventional magenta dye-forming coupler from the prior art and is coupler No. 7 in U.S. Pat. No. 2,600,788.

Coupler B is 1- { 4-[α-(2,4-di-tert-amylphenoxy)-butyramido]-phenyl}-3-(4-methoxyanilino)-4-(1-phenyl-5-tetrazolylthio)-5-pyrazolone. This DIR coupler of the prior art is disclosed in U.S. Pats. No. 3,148,062 and No. 3,227,554.

Coupler C is 1-{4[α-(3-pentadecylphenoxy)butyramido]-phenyl}-3-ethoxy-4-(1-phenyl-5-tetrazolythio)-5-pyrazolone. This DIR coupler of the prior art is coupler 37 of U.S. Pat. No. 3,227,554.

Coupler 30 is a DIR coupler of our invention. FIG. 1 shows the H and D curves of the magenta dye images derived from exposing and processing coatings containing these couplers as set forth above. The curves indicate that although all three DIR couplers have effectively inhibited development the H and D curve of the coating 14, containing coupler 30, has a longer, straighter, straight-line section than the H and D curves of coatings 12 and 13 which contain DIR couplers of the prior art. A longer linear response to exposure results in an emulsion which has greater usable exposure latitude.

EXAMPLE 45

A series of tests were made to determine the stability of couplers of this invention and to compare it to those of the prior art. A first set of samples of three supported single layer gelatinous silver halide emulsion coatings each containing per square foot of coating 400 milligrams of gelatin and the couplers and silver bromoiodide as shown in table 3 were sensitometrically exposed through a graduated density test object. Black and white developed in Kodak D–50 developing solution, washed, fixed, washed, and dried. A second set of samples of the same coatings was treated similarly except that these samples were incubated for one week at a temperature of 120° F. and a relative humidity of 50 percent prior to their exposure and subsequent processing. The H and D curves of the silver images in the processed fresh and incubated coating samples are illustrated in FIG. 2.

TABLE 3

| Coating | Mg.Ag. × 1 ft.² | Couplers (mg./ft.²) A | B | 30 |
| --- | --- | --- | --- | --- |
| 21 & 22 | 250 | 86 | | |
| 23 & 24 | 220 | 86 | 99 | |
| 25 & 26 | 250 | 86 | | 93 |
| | | (0.128 | 0.128 | 0.128)* |

*(millimoles/ft.²)

Coupler A is the same conventional magenta dye-forming coupler used in Example 44.

Coupler B is the same DIR magenta dye-forming coupler of the prior art used in Example 44.

Coupler 30 is a development inhibitor releasing coupler of the present invention. It will be noted that coatings 23 and 24 contained less silver halide per square foot of coating than did the other coatings but were otherwise identical to the other coatings of this example. Since all six coatings of this example were developed with a black and white photographic developing agent which does not couple with the color couplers thereby splitting off the development inhibitor moiety, the only development inhibition to be observed upon processing of these coatings would be caused by development inhibitor moieties present in the emulsion which split off because of the inherent instability of the coupler to which they were attached. It may be seen that photographic speed, contrast and maximum density of the silver images in the samples of coatings 21 and 22 (not containing a DIR coupler) and 25 and 26 (containing a DIR coupler of the present invention) remained essentially unaffected by the raw stock incubation whereas incubated coatings 23 and 24 (containing a DIR coupler of the prior art) suffered a loss in speed, contrast and maximum density. These results indicate the superior stability of the DIR couplers of this invention as compared to the stability of the DIR couplers of the prior art.

EXAMPLE 46

This example demonstrates the enhanced image sharpness obtainable by use of couplers of this invention. Samples of three supported single-layer gelatinous silver halide emulsion coatings each containing per square foot of coating 200 milligrams silver bromoiodide, 300 milligrams gelatin and the couplers listed in table 4 were given 10, 100 and 1,000 micron wide X-ray line exposures and processed by the procedure described in example 43.

TABLE 4

| Coating | D | E | Couplers (mg./ft.²) C | B | 30 |
| --- | --- | --- | --- | --- | --- |
| 31 | 88 | 15 | 4 | | |
| 32 | 88 | 15 | | 4.1 | |
| 33 | 88 | 15 | | | 3.8 |
| | (0.114 | 0.0161 | 0.0052 | 0.0053 | 0.0053)* |

*(millimoles/ft.²)

Coupler D is 1-(2,4,6-trichlorophenyl-3-{3-[α-(3-pentadecylphenoxy)-butyramido]-benzamido-5-pyrazolone. This conventional magenta dye-forming coupler is coupler No. 7 of U.S. Pat. No. 2,908,573. Coupler E is 1-(2,4,6-trichlorophenyl)-3-{2-chloro-5-[α-(4-hydroxy-3-tert-butyl-phenoxy)-tetradecamido]-anilino}-4-(α-naphthylazo)-5-pyrazolone. This is an orange yellow magenta dye-forming coupler designed to produce an integral mask for the correction of unwanted absorption of blue light by the magenta image dye formed from Coupler D. Microdensitometric traces of the images produced by the X-ray exposures are made and the maximum density at the edge and the center of the three lines is read and the relative densities above gross fog are shown in table 5 below. It will be noted that in this example the center and the edge of the 10 micron line image have essentially the same densities.

TABLE 5

Relative Density Above Gross Fog

| Coating | D Max At | 1,000 μ | 100 μ | 10 μ |
| --- | --- | --- | --- | --- |
| 31 | center | 1.1 | 1.2 | 1.2 |
| | edge | 1.2 | 1.3 | 1.2 |
| 32 | center | 0.7 | 0.9 | 1.2 |
| | edge | 0.8 | 1.0 | 1.2 |
| 33 | center | 0.8 | 0.9 | 1.5 |
| | edge | 1.1 | 1.2 | 1.5 |

Examples of the appearances of these microdensitometric traces may be found in Barr, C. R.; Thirtle, J. R.; and Vittum, P. W., "Development-Inhibitor-Releasing (DIR) Couplers in Color Photography," Photographic Science and Engineering, pp. 78–79, Vol. 13, No. 2, Mar.–Apr. (1969). A description of the apparatus used to make these X-ray line images may be found in Sherwood, H. F., "Apparatus for Making Sharp Photographic Images with X-Rays," The Review of Scientific Instruments, Vol. 38, No. 11, 1,619–1,622, Nov. 1967. The results from Coating 31 containing the conventional magenta dye image-forming color coupler, the integral masking coupler and the 3-alkoxy DIR coupler of the prior art shows very little adjacency effect or Eberhard effect. Coating 32 containing the conventional magenta coupler, the integral masking coupler and a 3-primary amino DIR coupler of the prior art show some evidence of adjacency and Eberhard effects. Coating 33 containing the conventional magenta coupler, the integral masking coupler and a DIR coupler of this invention show the greatest adjacency and Eberhard effects and demonstrate that sharper images may be obtained from emulsions containing couplers of this invention.

The invention has been described in detail with particular reference to preferred embodiments thereof but it will be understood that variations and modifications can be effected within the spirit and scope of the invention.

We claim:

1. A light-sensitive photographic silver halide emulsion containing a compound having from one to two 5-pyrazolone moieties, at least one of said moieties having a carbon atom in its 3-position connected directly to a nitrogen atom in a 4 to 6 membered saturated cyclic amino group, such that when said compound has two 5-pyrazolone moieties they are linked together through the carbon atom in the 4-position of each moiety by a linkage selected from a class consisting of a bond, a lower alkylene group, a lower alkylidene group and a benzo[1,2-d:4,5-d']bistriazolyl group.

2. A light-sensitive photographic silver halide emulsion containing 1-{4-[α-(2,4-di-tert-amylphenoxy)-butyramido]phenyl}-3-(1-pyrrolidino)-4-(1-phenyl-5-tetrazolythio)-5-pyrazolone.

3. A light-sensitive photographic silver halide emulsion containing 1-{4-[α-(2,4-di-tert-amylphenoxy)-butyramido]-phenyl}-3-(1-pyrrolidino)-4-(2-benzothiazolythio)-5-pyrazolone.

4. A light-sensitive photographic silver halide emulsion containing 1-{4-[α-(2,4-di-tert-amylphenoxy)-butyramido]-phenyl}-3-(1-morpholino)-4-(1-phenyl-5-tetrazolylthio)-5-pyrazolone.

5. A photographic element comprising a support having thereon at least one layer containing an emulsion of claim 1.

6. A process for developing a photographic silver halide emulsion layer in an aqueous alkaline solution of a primary aromatic amine color developing agent, said emulsion layer containing at least one compound having from one to two 5-pyrazolone moieties, at least one of said moieties having a carbon atom in its 3-position connected directly to a nitrogen atom in a 4 to 6 membered saturated cyclic amino group, such that when said compound has two 5-pyrazolone moieties they are linked together through the carbon atom in the 4-position of each moiety by a linkage selected from the class consisting of a bond, a lower alkylene group, a lower alkylidene group and a benzo[1,2-d:4,5-d']bistriazolyl group.

7. A process for developing a photographic silver halide emulsion in an aqueous alkaline solution consisting of a primary aromatic amine color developing agent and at least one compound having from one to two 5-pyrazolone moieties, at least one of said moieties having a carbon atom in its 3-position connected directly to a nitrogen atom in a 4 to 6 membered saturated cyclic amino group, such that when said compound has two 5-pyrazolone moieties they are linked together through the carbon atom in the 4-position of each moiety by a linkage selected from the class consisting of a bond, a lower alkylene group, a lower alkylidene group and a benzo[1,2-d:4,5-d']-bistriazolyl group.

* * * * *